US006433839B1

(12) United States Patent
Siefken (10) Patent No.: US 6,433,839 B1
(45) Date of Patent: Aug. 13, 2002

(54) METHODS FOR GENERATING IMAGE SET OR SERIES WITH IMPERCEPTIBLY DIFFERENT IMAGES, SYSTEMS THEREFOR AND APPLICATIONS THEREOF

(75) Inventor: Douglas R. Siefken, Chicago, IL (US)

(73) Assignee: hOURplace, LLC, Chicago, IL (US)

( * ) Notice: Subject to any disclaimer, the term of this patent is extended or adjusted under 35 U.S.C. 154(b) by 0 days.

(21) Appl. No.: 09/538,137

(22) Filed: Mar. 29, 2000

(51) Int. Cl.[7] ................................................ H04N 5/14
(52) U.S. Cl. ......................... 348/700; 348/173; 348/578
(58) Field of Search ................................. 348/699–701, 348/390, 578, 173; 345/427, 626, 619, 625, 646, 660, 661, 672, 473, 475, 726

(56) References Cited

U.S. PATENT DOCUMENTS

| 4,520,396 | A | * | 5/1985 | Dischert et al. ............ 358/167 |
| 4,807,027 | A | * | 2/1989 | Muto ......................... 348/159 |
| 5,471,239 | A | * | 11/1995 | Hill et al. ................... 348/155 |
| 5,793,985 | A | | 8/1998 | Natarajan et al. ........... 395/200 |
| 5,969,755 | A | * | 10/1999 | Courtney .................... 348/143 |
| 6,130,707 | A | * | 10/2000 | Koller et al. ............... 348/155 |
| 6,215,519 | B1 | * | 4/2001 | Nayar et al. ................ 348/159 |
| 6,300,956 | B1 | * | 10/2001 | Apodaca et al. ............ 345/433 |
| 6,304,268 | B1 | * | 10/2001 | Iourcha et al. .............. 345/428 |

* cited by examiner

*Primary Examiner*—Victor R. Kostak
(74) *Attorney, Agent, or Firm*—Sonnenschein, Nath & Rosenthal

(57) ABSTRACT

A method for generating a series of images for playback on a display, each image in the series being imperceptibly different from an immediately preceding different image in the series, methods for displaying such images, systems for generating and/or displaying the images and media carrying such images. The image series is displayed with such timing that an ordinary viewer cannot perceive the transitions or differences between adjacent or successive images, yet over time, the displayed scene will progress so that at widely disparate points in time, the displayed images are perceptibly different, i.e., the scene can be noticeably different.

39 Claims, 7 Drawing Sheets

METHODS FOR GENERATING IMAGE SET OR SERIES WITH IMPERCEPTIBLY DIFFERENT IMAGES, SYSTEMS THEREFOR AND APPLICATIONS THEREOF

BACKGROUND OF THE INVENTION

The invention relates to methods for generating and manipulating images, i.e., image processors, as well as products and the like either carrying the images and/or the coding therefor.

Examples of previously known systems and/or methods for generating images that transition from one to another are screen savers for computers, programs for generating so-called morphed images, etc. However, all of these systems/methods generate images in a sequence that are perceptibly different from one another, i.e., they generate images for the purpose of effecting a discernable transition over a relatively short period of time. The result is that two given sequential images are perceptibly different from each other. Thus, an ordinary human observer can perceive a difference between successive images or frames in the series.

At least one problem associated with the playback of a sequence of images with perceptible differences therebetween, is that the motion and/or flicker and flashing created by the transitions between images can be quite annoying, if not distracting. Many can relate to being distracted by the flashes caused by a nearby television, or simply nearby motion. Some might respond by redirecting their attention to the television or motion, even if only temporarily, due to the natural response to want to acquire information about the motion. Others might become agitated because of the constant bombardment of light signals on that person's senses.

Relative to the use of the invention in image display, there are some issues worthy of consideration regarding electronic display devices. A display, such as a flat panel display, when mounted on a wall or the like, and when not in use, can present an invasive black space that can contrast with other aesthetic considerations such as art work located nearby or displaced by the display. Cathode ray tube devices, in contrast, have frequently been hidden within cabinets, but as they increase in size, they consume more space and become more difficult to conceal.

SUMMARY OF THE INVENTION

The invention provides methods/systems for producing images along a transition path (defined below) wherein sequential different images are imperceptibly different (defined below) from each other, media/devices carrying such images, and methods/systems employing such images. The result is the display of a series or set of images in such a way that an ordinary viewer will not perceive the transitions between different images, or motion caused by such transitions, except over relatively widely disparate points of time, and thus not be subject to the distractions/annoyance caused by changes in a display.

In one aspect, the resultant display of such an image series or set is a "still" image that evolves unnoticeably over time, and perhaps even a type of art form. This then provides an image display that can allow a display to display images without introducing distraction. Further, such a display can present an aesthetic enhancement as an artistic outlet.

In an embodiment, the invention provides a method for generating images in which a series or set of transition images are generated along a transition path from a first image to a second image. The transition images are generated such that a given transition image is imperceptibly different from an immediately preceding image.

In an embodiment, the transition images are then displayed in sequence over a period of time sufficiently long so that a change in display from one image to a succeeding different image cannot be perceived by an ordinary human observer, yet over time, the display transitions from the first image to the second image.

In this application, for convenience, several definitions have been adopted and apply throughout. These definitions are as follows:

Transition path: a series or set of images representing a progression, an evolution or changes from a first image to a second image, in steps. Typically the progression will be rational, for example linear, exponential, etc, or otherwise reproducible. However, it is also contemplated that the progression can be random, and not reproducible. Further, typically, a series or set of images along the progression will be displayed chronologically, although other displays such as spatially displaced images, are contemplated. In the latter instance, a series of transition images can be displayed simultaneously but along some spatial continuum.

A series or set of images incorporating a transition path need not all be different, and indeed in at least one aspect of the invention, a series of images is provided in which each different image is provided as a set comprising a plurality of copies of the same image. This aspect is the result of current applications in which a series of images essentially comprises a movie upon playback, and current movie playback systems require that a plurality of copies of a given image be displayed in seriatim in order to achieve an effective slower timing between transitions between different images.

Further, a set of images can be formed which are imperceptibly different, yet which are not played back in the order generated. If the differences are sufficiently small, then some images may be displayed out of order of generation without being noticed.

The foregoing matters will become clearer below.

Transition image: an image along a transition path incorporating an image difference relative to a preceding image. The "second image" referred to in the definition of "transition path" can be a transition image, and typically is the last transition image along the transition path.

Image difference: any difference between two images, including differences in hue, brightness, saturation, color space component or angle of view, whether on a pixel level, subpixel level or block of pixels level.

Imperceptible image difference, images that are imperceptibly different, and the like: an image difference that cannot be perceived by an ordinary human observer. It is accepted that generally, an ordinary human observer cannot perceive a change of 20 percent or less in any single component of a color space. For example, an ordinary human observer typically cannot perceive a 20 percent change in any one of hue, luminance, saturation and a color component, such as cyan, magenta, yellow, red, or green. It has also been stated that an ordinary human observer cannot perceive a difference in motion below about 0.03 of a degree of the visual angle per second. A change in view of 5 seconds of arc of view or greater has also been deemed perceptible. Finally it has been stated that the threshold for the human eye is a function of the apparent angular size and brightness of the scene. In optimum conditions and spots greater than about 10 arc-minutes the contrast is as low as 0.3%, rising to about 1.0% at about 5 arc-minutes, 15% at about 1.0 arc-minute and about 30% at the smallest resolvable detail at about 0.7 arc-minute with normal eyesight. See Blackwell, H.R., Contrast Thresholds Of The Human Eye, J. Optical Society of America, Vol. 36, pp. 624–43 (1946).

In displaying images along a transition path, in which a given image is imperceptibly different from an immediately preceding different image, timing of the transition is also a consideration in maintaining imperceptibility. That is to say, presumably one could transition so fast through the series of images, that the transitions and/or motion displayed by such transitions would be noticeable, even though the difference between any two images in the series would be imperceptible. Accordingly, to transition imperceptibly through the different images, the timing of the display of each different image should be on the order of 5 seconds or more. Obviously, the longer the display period there is less chance for perception of the differences.

Accordingly, an aspect of the invention is a resultant display of images that appear as a still image, but which in reality progress through a sequence to provide an evolution in character and/or scene without perceptible motion or transitioning.

In an embodiment, of the invention, to generate a transition path, first and second images are compared, and then an imperceptibly different transition image is generated as an incremental change from the first image to the second image.

In an embodiment, the first and second images are processed in a digital format and are compared pixel by pixel, and a corresponding pixel is generated in a transition image that is twenty steps (pixel values) closer or less to the value of the corresponding pixel of the second image from value of the corresponding pixel of the first image.

These and other features and/or aspects of the invention are described below in the following detailed description of the presently preferred embodiments with reference to the accompanying drawings.

DETAILED DESCRIPTION OF THE PRESENTLY PREFERRED EMBODIMENTS

Presently, it is envisioned that a set or series of images can be generated and stored for playback in such a manner that, to the eyes of the ordinary human observer, a display imperceptibly progresses or evolves through the images. For example, over a sufficiently long period of time, a display can progress or evolve from a first image to a second image which is identical in scene, but with a color space change. This color space change could simply be a change in value of a particular color component or other characteristic, such as brightness. Between the two images is a series of transition images with progressive color space changes the stepping through of which cannot be detected by the observer.

This concept involves more than merely slowing down the transitions generated by a typical image morphing program. Instead, the individual images along the transition path are generated so as to be imperceptibly different from an immediately preceding different image, i.e., the difference between successive different images is kept to within the parameters defined above, e.g., a color space component change of 20 percent or less, or a change in angle of view of 5 seconds of arc, etc. Thus, it can be understood that generally, an image manipulation program such as a so-called morphing program can be used to generate images which are then used as the beginning and ending images of a transition path.

Various color spaces are known, and can be considered for characterizing an image or portion thereof. Some known color spaces are: RGB, CMY, YIQ, HSV and HLS. These are well known and discussed, e.g., on the worldwide web at http://cs.fit.cdu1~wds/classes/cse5255/davis/text.htm/#RGB, and incorporated herein by reference. A printout is provided along with the application. Another color space listing, also incorporated herein by reference, is available at http://www.cgsd.com/colorspaces.html, a printout of which is provided herewith.

It is conceivable that through use of very high speed motion photography of a scene with very low motion, and subsequent very slow playback, a similar effect can be achieved. However, the present invention is different in that it concerns image processing to achieve the end result, and through image processing can provide many features not available with a film-based process. That is to say, in accordance with the present invention, transition images are generated from one or more provided images. In contrast, in high speed photography, a series of original images are generated, and they are not subsequently processed to generate transition images.

To be sure, as discussed below, the resultant transition images could be stored on film and played back using film projection techniques. Thus, for example, the individual frames of a high speed remote could be used as the boundaries for a series of transition paths. The playback of the enter series of transition paths would result in a slowing down of the film or playback and in more gradual transition between frames.

In accordance with one aspect of the invention, to produce a transition path, an initial image, which itself can be a first image along a transition path, or a transition image along the path, is compared to a second image, which can be a transition image, and differences are noted. Typically, the first and second images will be the initial and final images along the path. In any event, the noted differences can vary depending on the parameters selected. For examples, differences in pixel values for digital images, differences in one or more color space components, differences in angle of view, differences in spatial positioning of objects, etc. may be noted. Then a transition image along the transition path between the first and second images is generated, the transition image being an imperceptible evolution from the first image to the second image.

It can be appreciated that the greater the dissimilarity between the first and second images, the greater the number of transition images needed to created an imperceptible progression between them. This is because there will a greater number of different attributes that need be taken into consideration in calculating changes to create the transition images, as well as a greater range of values to progress through.

As is known, pixels on typical hardware configurations are capable of assuming values between 0 and 255 in terms of luminance. This includes the sub pixels corresponding to the different color channels in a color monitor. The particular combination of luminosity values assumed by the pixels and/or subpixels determines color, contrast, sharpness, etc. Thus, there are 256 linear steps or increments possible between the ends of the range. A twenty percent difference along such a range is on the order of 50 steps.

In a presently preferred simple routine for accomplishing the foregoing transition image sequence creation, the two images are compared, channel by channel, pixel by pixel, and a transition image is generated in which the pixel values include a 20 step progression or less (i.e., less than 10 percent change) from the value of the corresponding pixel in the first image toward the value of the corresponding pixel in the second image. The progression is limited to the final value so that at some point, the last transition image and the second image are the same.

Of course, if the pixels of a display can assume a greater or lesser range, such a 32 bit range or a 4 bit range, then the number of steps may be greater or lesser, respectively. However, it is believed that the percentage change factor for perceptibility remains the same.

Given a series of transition images making up the transition path, the images can be played back or displayed with a timing that produces a "movie" of an evolution from the first image to the second image in which the transitions between the images cannot be perceived by the ordinary human observer. To be sure, the observer would note that the display appears different at two sufficiently disparate points in time.

Additionally, given a suitable system, such a transition path can be generated in real time and broadcast so that the "movie" is displayed in real time. A display system would then be programmed and/or tuned to the broadcast signal so as to receive and display the images as they are broadcast, or to receive and store the images for subsequent broadcast.

To be sure, if the first and second images are widely dissimilar, along the transition path there may be unrecognizable images. Moreover, the more dissimilar the first and second images, the greater the number of transition images are needed to created an imperceptible progression between them. Accordingly, in the case where a transition path between two selected images is desired, it is likely better to use two similar images. This preference applies mostly to recognizable images such as classical paintings and the like.

Finally, it can be appreciated that the methods described herein can be performed manually or automatically. That is to say, by way of example only, to generate a transition image, one can manually compare different pixel values and then manually manipulate pixel values using known computer software. To be sure, to manually produce transition images may be a tedious process. Alternatively, an algorithm can be written to effect either or both the comparison function and the image generation function.

In producing transition images manually, one can use any of a variety of image manipulation applications available on the market such as the following: AdobePhotoShop and After Effects™; Blue Ice—Ice'd After Effects Ultra™; Video Toaster™; Media 100™; and Lightwave VT™, to name a few.

To illustrate more clearly the concepts involved in this invention, reference will now be made to the drawings.

Figure 1:
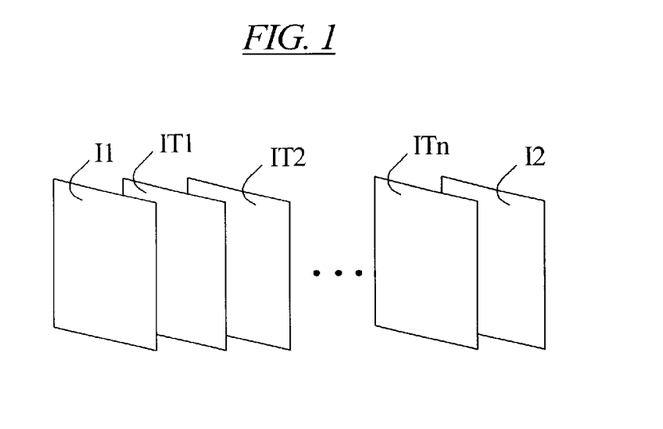
FIG. 1 illustrates in schematic form a series of transition images.

In FIG. 1 there is illustrated a series of images along a transition path. The series starts with a first image I1 and ends with a final image I2. In between image I1 and image I2, are transition images IT1, IT2, . . . , ITn. Image I1 might be a white flower and image I2 might be the same flower, but colored red. Alternatively, Image I1 might be the upper left corner of an M. C. Escher illustration (for example "Day and Night"), and Image I2 might be the lower right corner of the same illustration. See FIG. 3 in this regard.

In accordance with the invention, the number of transition images IT1 to ITn will be sufficient to allow playback with a timing such that an ordinary observer will not perceive the transitioning between the transition images. Yet, the display of the images will progress over that time period for image I1 to image I2.

Figure 2:
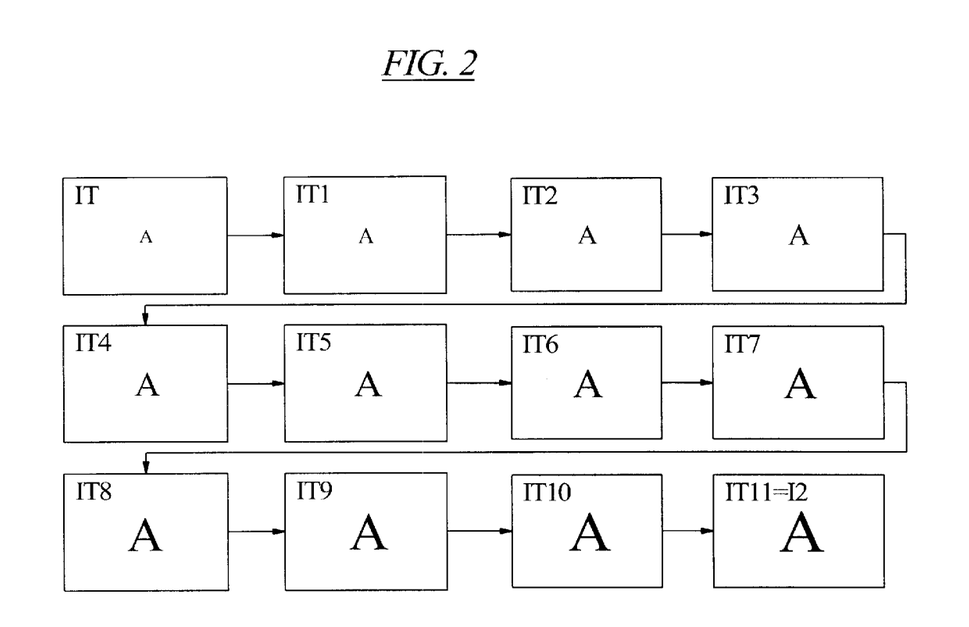
FIG. 2 illustrates in schematic form a specific generation of transition images.

This is illustrated somewhat in FIG. 2 where a series of images transition between a capital letter "A" in 10 point font to a capital letter "A" in 36 point font. The images are as follows:

| Image | Point Size |
| --- | --- |
| I1 | 10 |
| IT1 | 11 |
| IT2 | 12 |
| IT3 | 14 |
| IT4 | 16 |
| IT5 | 18 |
| IT6 | 20 |
| IT7 | 22 |
| IT8 | 24 |
| IT9 | 26 |
| IT10 | 28 |
| IT11/12 | 36 |

Even at this level the differences between the images are noticeable. But, FIG. 2 is provided only to illustrate how an image series might progress along a transition path. The number of transition images will be greater to effect a more gradual, imperceptible progression, because each increase in size in the letter includes at least one 100 percent change in the value of a pixel from full white to full black. Thus, for example, images IT7 and IT8 are not immediately successive transition images, but rather selected images for the purposes of explanation.

Figure 3:
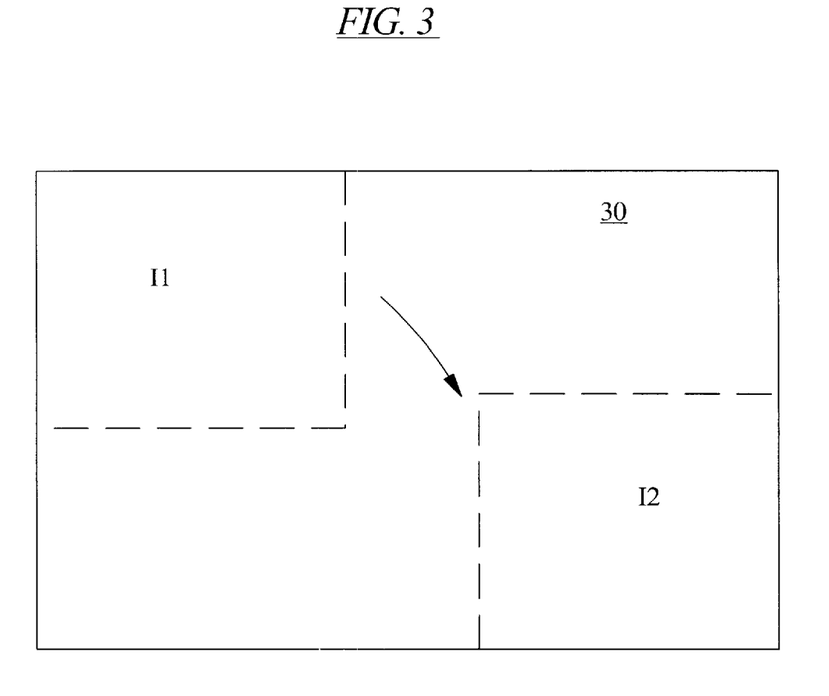
FIG. 3 illustrates the beginning and end points of a transition path relative to a change in spatial displacement along a larger image.

In FIG. 3, it is illustrated how a series of images can effect a translation across a larger image 30. By generating a suitable number of transition images that are played back over a suitably long period of time, the displayed images can "move" imperceptibly across the larger image 30. Image I1 thus represents the starting point, while image I2 represents the final point of translation.

A well know illustration of M.C. Escher is called "Day and Night." In this illustration, one half comprises an illustration of a daytime scene while the other half comprises a night time scene. There is a surreal visual transition between the two halves such that birds flying in one direction in one half appear to fly in the opposite direction in the other half. Such an illustration would be very appropriate for a visual translation thereacross using the present inventive technique.

The concept of translation may be particularly useful when translating about a 360 degree panoramic view. There are currently available a number of such panoramic images on the World Wide Web that are played back using Apple Computer's QuickTime™ multimeida player. Such images could be used as an input into a system processing images in accordance with the invention to produce a very slow panning about the image.

Again, in such translations or pans, each 1 pixel translation would represent the beginning and ending of a "sub" transition path, as each 1 pixel translation can represent a 100 percent change across the full range (e.g., 0–255) of pixel values. Upon playback of all of the "sub" transition paths, one would the translate across or pan the entire image.

Figure 4:
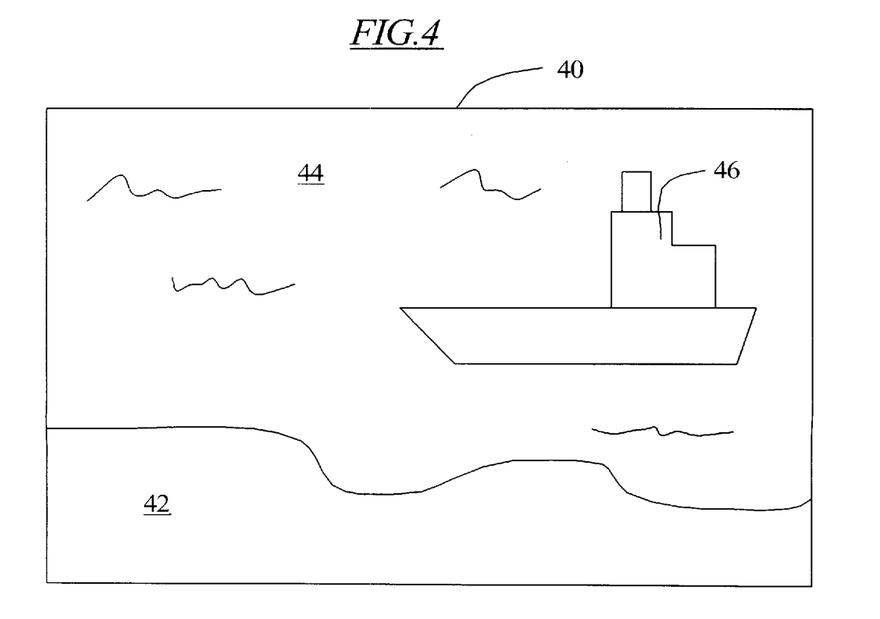
FIG. 4 illustrates an image useful for explaining relative motion between objects in an image.

In FIG. 4 there is illustrated a picture 40 with three objects which can be defined as such via a suitable programing language so that they can be separately manipulated. The illustrated objects are a beach 42, a body of water 44 and a ship 46. In accordance with the invention, the objects 42, 44 and 46 can be interrelated to define a first image for display. Then, in accordance with the parameters defined above, the objects can be manipulated to produce transition images. For example, the location of the ship 46 to move across the body of water 44. However, in accordance with the principles discussed herein, such relative movement would be perceptible to the ordinary viewer. Of course, a viewer who views the display at widely disparate points in time will notice the change in position of the ship 46. However, one watching the display throughout the progression will not notice the movement.

Again, given a digital image, each translation of an object of 1 pixel would represent the beginning and ending of a transition path. Upon playback of a given set of transition paths, the objects will be able to move relative to one another. Further, by superimposing and combining transition paths, or at least predetermined concurrent scene changes during the generation of the transition paths, other effects can be implemented, such as a simultaneous change in time of day, weather, etc.

The types of scenes that can be so manipulated are innumerable. As another example, a scene of a bay or port could be manipulated to transition between low and high tide and back again.

As can be appreciated, the exact configuration of a system and/or software application for generating such transition paths is open to the whims of the software programmer. Generally, however, it is believed that the systems and/or software applications will follow the methods set forth herein.

Figure 5:
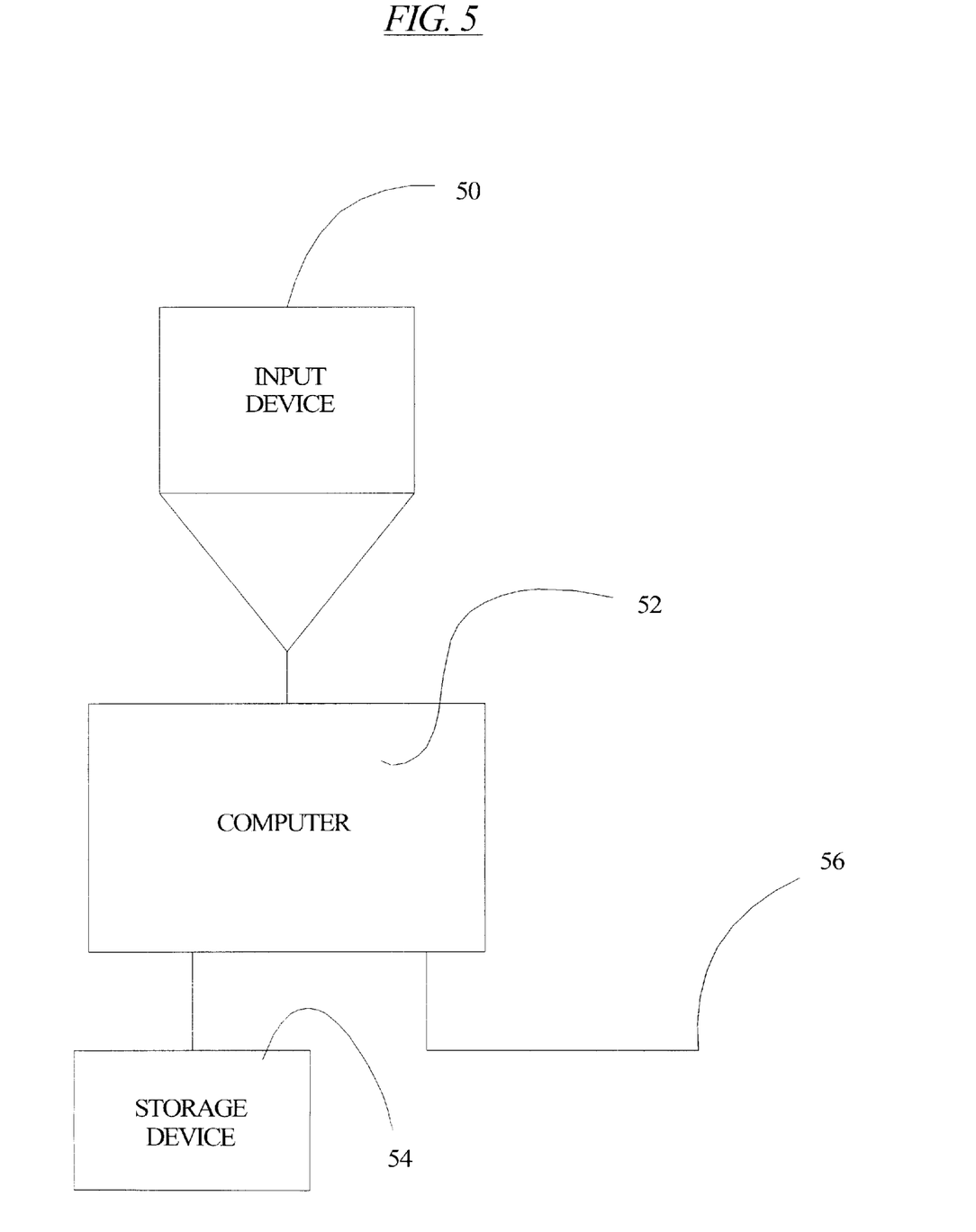
FIG. 5 illustrates in schematic form a system for generating images in accordance with principles of the invention.

In FIG. 5, there is illustrated in schematic form a system for generating transition images. Via an appropriate interface 50, on or more images are input into a computer 52 for generation of the transition images. The computer typically will be a general purpose computer programmed with application software employing the concepts discussed herein. However, the nature of the makeup of such a computer, including its internal storage capacity, runtime memory, etc., will in part be dictated by the size and number of images being generated. Further the exact image characteristics being evaluated and changed should have some impact on that determination.

The manner in which an image is input can also be any of a variety of inputs. Interface 50 is representative of input mechanisms such as scanners, film scanners, cameras, video feeds, digital image feeds, disk players, etc. The computer 52 is appropriately programmed or includes the necessary software applications to extract an image from such sources in the widely know ways.

After or while the transition images are being generated, they are then either sent to a suitable storage device 54 or broadcast via terminal 56.

Suitable storage devices includes, but are not limited to solid state memory such as RAM or programmable ROM, optical recording devices(CD, laser disks, DVD), magneto-optical disks, memory modules (e.g., compact flash memories, Sony Corporation's Memory Stick™, etc.), magnetic recording devices, etc. The broadcast terminal 56 is representative of a myriad of broadcast or communications channels including cellular systems, cable systems, telephone systems, wireless systems such as known 900 MHZ systems, BLUETOOTH™ systems, networking systems, infrared systems, etc. In short, the broadcast terminal 56 represents all known communications systems and channels for transmitting a signal containing image information.

It should be noted that the implementation of the present invention is particularly suited for low bandwidth situations. Because high refresh rates are not of concern, images can be generated at a slow pace and transmitted at slow speeds. The transmission needs typically would appear to be just the opposite of most other current applications seen today where ever increasing transmission bandwidth is demanded to accommodate changing graphics and other high amounts of information. Of course, higher bandwidth might be required for large format images.

Figure 6:
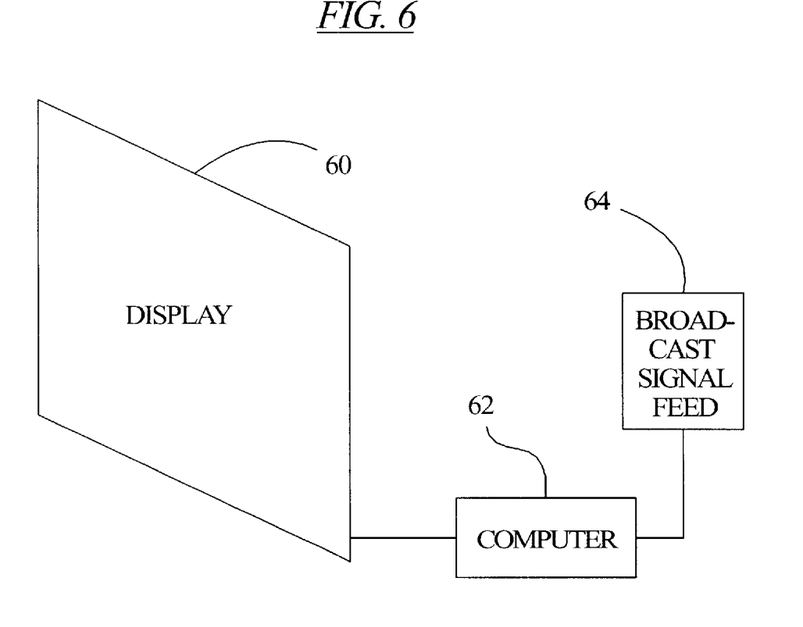
FIG. 6 illustrates a system for displaying images generated in accordance with principles of the invention.

In FIG. 6 there is illustrated an example of a large display incorporating principles of the present invention. A display 60 is representative of a large screen used in large advertising signs, such as large road side displays. Associated with display 60 is a computer 62 with sufficient memory to accommodate storage of a desired transition path. For example, the transition path could be a scene that progresses from daytime to nighttime (and back again when played in reverse). The computer would be programmed to playback the transition path using any of the known playback software applications or players suitable for the file format of the transition path. For example, the file format could be the AVI format. An AVI (Audio Video Interleaved) file is a sound and motion picture file that conforms to Microsoft Corporation's WINDOWS™ Resource Interchange File Format (RIFF) specification. AVI files (which end with an .avi extension). Many suitable players are available for download over the World Wide Web and some are even provide as original equipment on computer systems.

As illustrated, the computer 62 may also be programmed and equipped to receive broadcast signals via a suitable feed 64. The feed 64 can be a telephone line or suitable wireless feed, such as a satellite pickup. With this enhancement, new transition paths can be downloaded to the computer in order to effect a change in the display (i.e., to change the message or advertisement) or to enable real time playback of a remotely generated transition images.

The advantages of such a display system include at the very least, signnage that can evolve over time, but which does not create a distraction for passing motorists.

Figure 7:
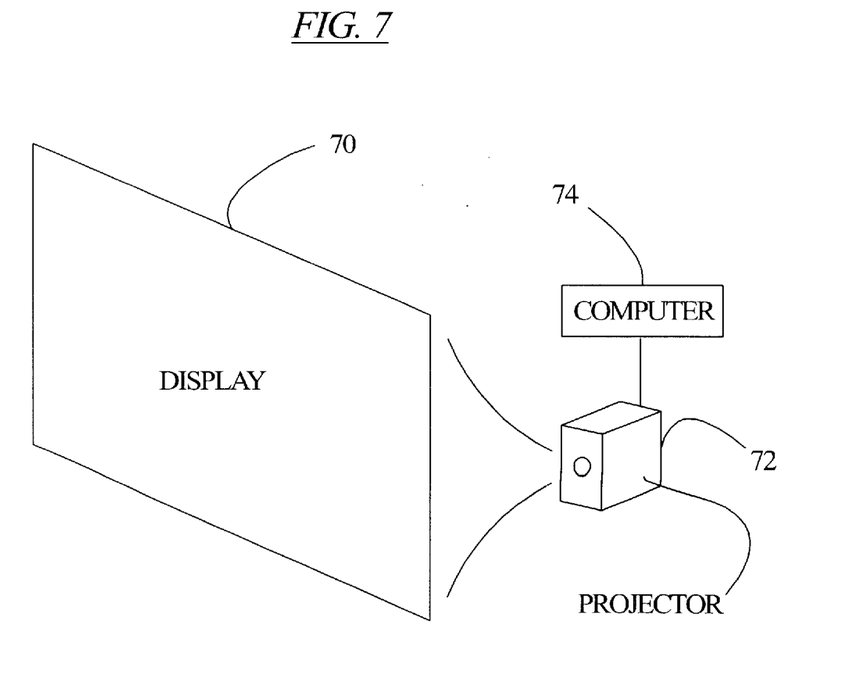
FIG. 7 illustrates another system for displaying images generated in accordance with principles of the invention.

In FIG. 7 there is illustrated another display 70 which serves as the background screen behind a speaker, for example someone giving a presentation on a dais. Projecting images onto the background screen is a suitable LCD projector 72. The projector 72 is coupled to a computer 74 with a DVD drive 76. As can be appreciated, over a reasonable time frame, for example, one hour, the computer 74 and projector 72 can be used to project a transition path formed in accordance with the principles set forth herein in order to display a background that evolves imperceptibly during that time period. As an example, over the time period a motivational message or logo can be made to appear.

Figure 8:
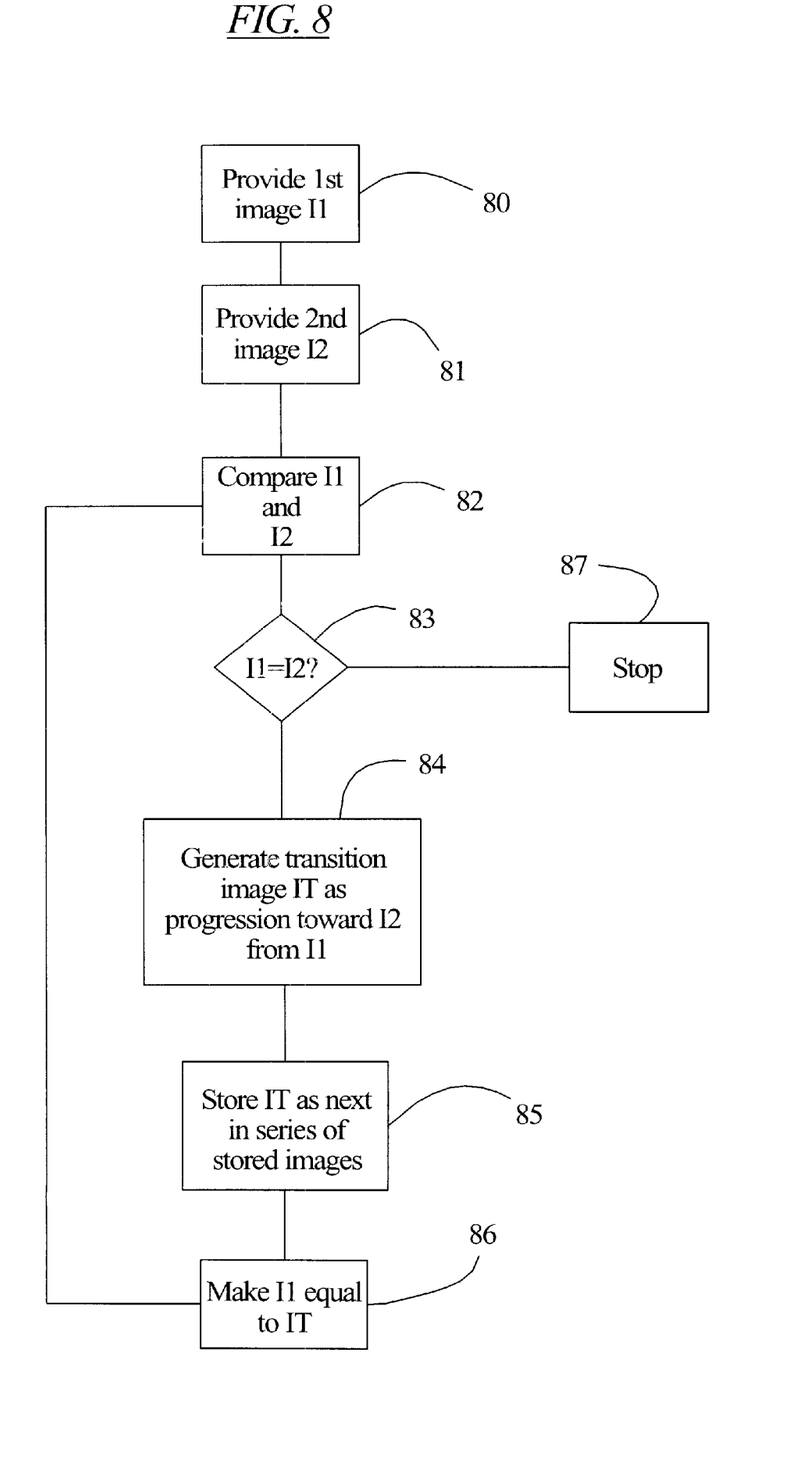
FIG. 8 illustrates in flow chart form a basic method for generating images in accordance with principles of the invention.

In FIG. 8 there is illustrated a basic method for generating a transition path essentially as discussed above. In a step 80, a first image I1 is provided from whence the transition path will start. In a step 81, a second image I2 is provided. It is to this image that the transition path will progress and end.

In a step 82 the images I1 and I2 are compared and differences noted in accordance with the parameters the system will allow change. Preferably, as also discussed above, the changes will be noted as differences in pixel values. For example, in this step, all 3 channels (RGB) for all pixels in the images can be compared using the values of the subpixels.

If image I1 and I2 are the same in all respects, then the transition path is complete and the method is stopped by proceeding to step 87. However, if a difference still exists between images I1 and I2, then, in step 84, a transition image IT is generated as a progression from the current image designated I1 toward image I2. For example, IT can be an increment/decrement of a given value (e.g., 10) from a given subpixel of I1 toward I2. Of course, as noted above, the image IT will be generated as an imperceptible step toward image I2 within the thresholds defined above. The progression is also kept to within the limits set by image I2, i.e., the idea is not to generate an image that progresses beyond the changes required to reach image I2.

Thereafter, in step 85, the just generated image IT is stored as the next image in the transition path being generated. Alternatively, or even simultaneously, if a broadcasting of the images is desired, then in step 85, the just generated image IT can be broadcast. In any event, for most, if not all systems, the image IT will be stored somewhere at least temporarily.

Further, as noted above, if the difference increments implemented are sufficiently small, e.g., 5 percent differences are being implemented, it is possible to store the images in a slightly different order than that in which they were generated. The reason is that the difference in order will be imperceptible, by definition.

Thereafter, in a step 86, image I1 is set as image IT so that for the next comparison with image I2, I1 represents a closer progression toward image I2 thereby to advance the generation of the transition path.

It is recognized that instead of undertaking the foregoing steps, one might generate all of the necessary transition images at once be undertaking an evaluation as to the number of transitions images needed to progress in defined steps from the first image to the second image. In such a case, repeated comparisons would not be necessary. However, such a system would not necessarily work well in situations where transition images are generated in real time or "on the fly" and broadcast as they are being generated, i.e., in systems where the transition images are not stored.

Figure 9:
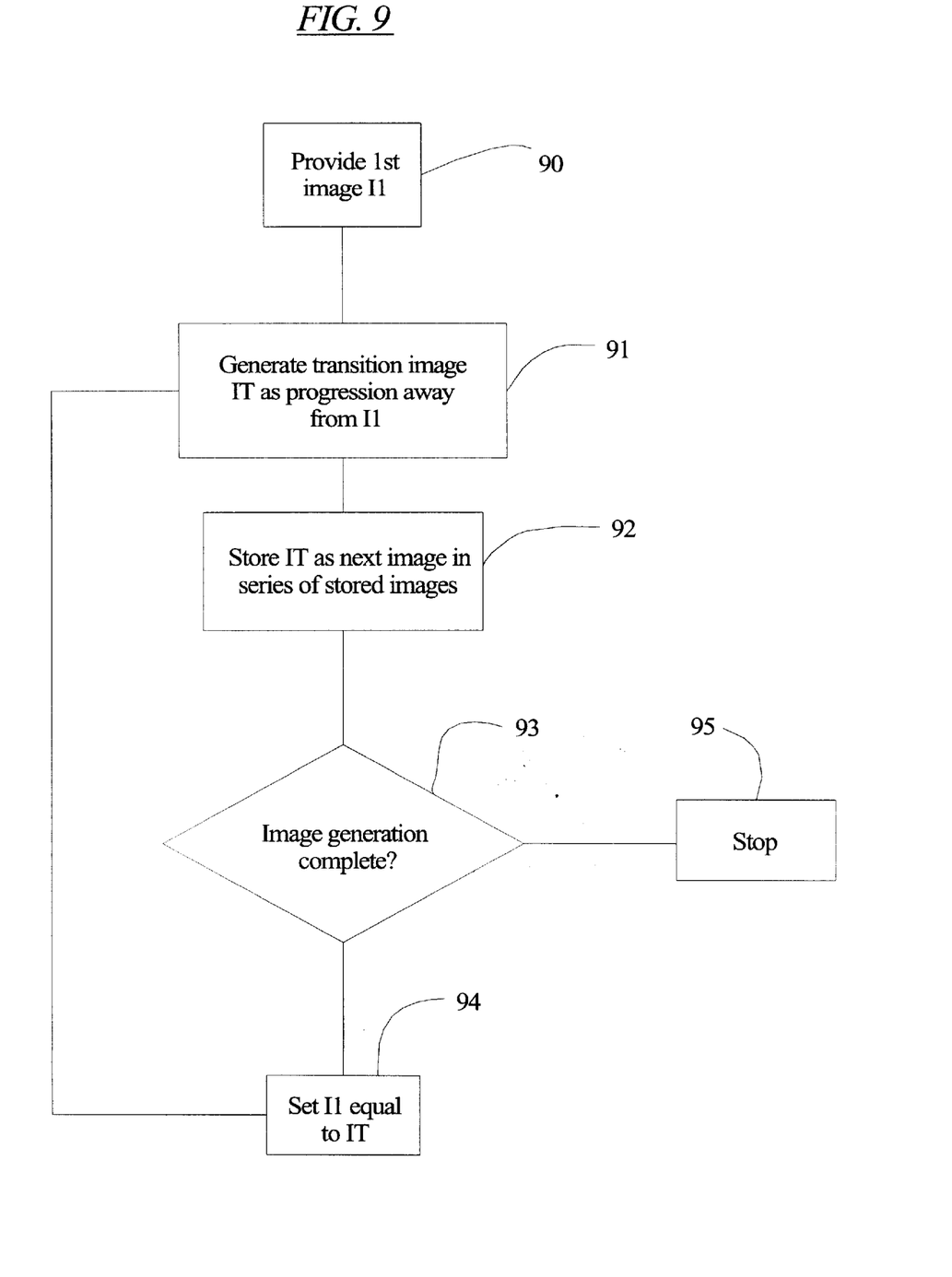
FIG. 9 illustrates in flow chart form another basic method for generating images in accordance with principles of the invention.
Figure 10:
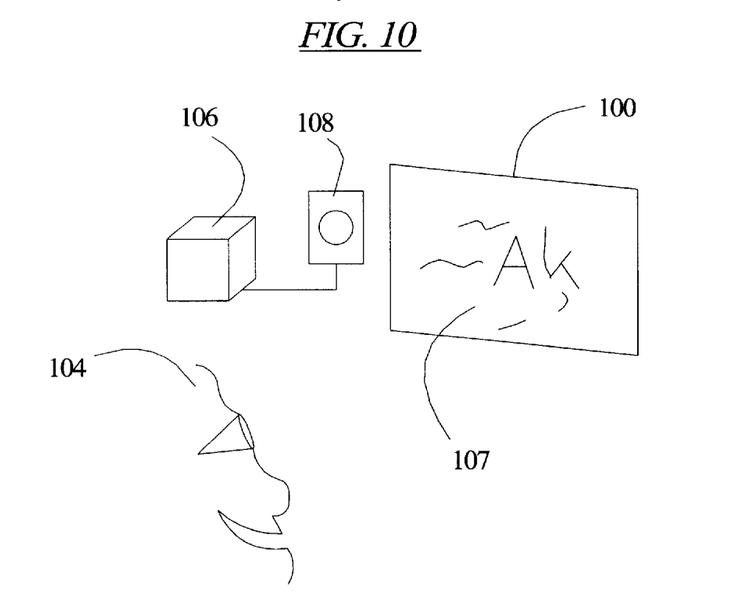
FIG. 10 illustrates a method of using the present invention in a medical testing application.

FIG. 9 illustrates a variation of the foregoing method but in which not comparison is made between a first image and a second image. Rather, as illustrated, a first image I1 is provided and the system then generates a transition path away from the first image. This might be useful in situations where only a change such as color is being effected.

As illustrated, in such a method, in a first step 90, the initial image I1 is provided by some suitable means. Then in a step 91, a transition image IT is generated as an imperceptible progression away from image I1. For example, a color component can be caused to change by 20 percent or less. Again, the amount of progression away can be random, or predetermined.

In a following step 92, the just generated transition image IT is stored as the next image in the transition path. Of course, as in the method previously described, instead of or in addition to storing a series of images, the image can be broadcast.

In a following step 93, a decision is made as to whether the transition path generation is complete. Suitable criteria might be length of the transition path, an on/off switch input, etc.

If the transition path determination is not complete, then the process is repeated to generate a new transition image. For that purpose, the image I1 is set to the most recent image IT so that the method will advance along the transition path.

It should be noted that in this method, the progression away from the first image can be orderly or random. For example, if the first image I1 is an abstract painting, it may well be that random imperceptible changes can be made. The transition path then would be a random progression imagery.

In FIG. 9 there is illustrated at least one medical application in a vision or neurological field for the present invention. In the illustrated application, a transition path is displayed on a suitable display 100 to produce an image 102 that evolves over time. In the illustrated case the letter "A" has finally developed to be perceptible on the display 100. A subject 104 undergoing testing can be monitored via a suitable system, such as the eye reflex sensor comprising a camera 108 coupled to a controller/processor unit 106. In such application, the subject 104 is evaluated to understand the subject's reactions to images or portions thereof as they appear on the display 100. Due to the slow progression in image changes in accordance with the invention, it is possible to minimize some distracting influences on the subject, such as other motion on the display, etc. It may be possible to better isolate responses to specific visual stimuli.

Another application for the invention is in the generation and playback of images as background in a business presentation or in an advertising presentation. Using the invention, roadside signs could be made so as to change imperceptibly so as not to be distractive to drivers, yet to enable the advertiser to have a changing sign. In this way, for example, an advertisement could appear different at night than during the day.

With respect to business presentations or the like, a background scene could evolve over a presentation in a way so as not to be distractive, yet to still provide an impact on an audience. An example in that regard, would be the eventual display of a logo or motivational message.

Yet another application for the invention is in the area of LCD light valves. The light valves could be programmed to change imperceptibly so as to provide a gradual change in the way light is allowed to pass therethrough. For example, a house with LCD screens covering a large window, could have the LCD screen display a transition path that effects a gradual shading of the window, and vice versa. Further, a clear patch or opaque patch can be formed so as to slowly track across a larger window, thereby allowing/blocking a light source such as the sun.

Yet a further application of the invention is in the presentation of images generated for artistic reasons. A display, such as a plasma screen, or a flat panel screen, could be used to display a new type of transition path as a new art form.

It can be appreciated that the foregoing methods and systems should not be limited to single or serial processing. Indeed, it would be very easy to also produce transition images in parallel using parallel processing techniques. In this instance, each processor would be programmed or controlled to generate a given transition image along a transition path, for example, a given percentage change from the first image. This may enable faster generation of multiple copies of a given transition path.

Again, the end result in most cases is the generation of a transition path that is played back much like a movie. Thus, the file format of the images can be of any suitable format such as MPEG, MPEG2, MPEG3, AVI, JPEG, TIFF, bitmap, etc. The types of formats are well known to those in the image processing fields. The only requirement is that the display controller be capable of reading such files by including, or being coupled to, a processor equipped to run a suitable software application or plug-in useful for the selected multimedia file format(s).

In connection with the foregoing, it is noted that such file or motion picture formats require the display of a certain number of images per second. In normal NTSC television format, the images are played back at a rate of 30 images per second, i.e., a frame rate of 30 frames per second. PAL television format uses a 25 frames per second display rate. Given that rate, and a calculated minimal display time of 5 seconds for imperceptible transition, 150 copies of a given transition image must be played back or displayed in seriatim in order to implement the principles discussed herein using current motion picture formats.

Given the foregoing, to implement the invention using current storage media such as DVD disks, one must store about 150 copies of each different image so that upon playback, each different image will display for at least 5 seconds. Thus, with reference to FIG. 8, for example, in the step 85, some 150 copies of an image are stored as the next image in a series of stored images. Of course, in a broadcast situation, where it is possible to simply continuously broadcast an image for at least 5 seconds, then only one copy at a time may need be produced.

Figure 11:
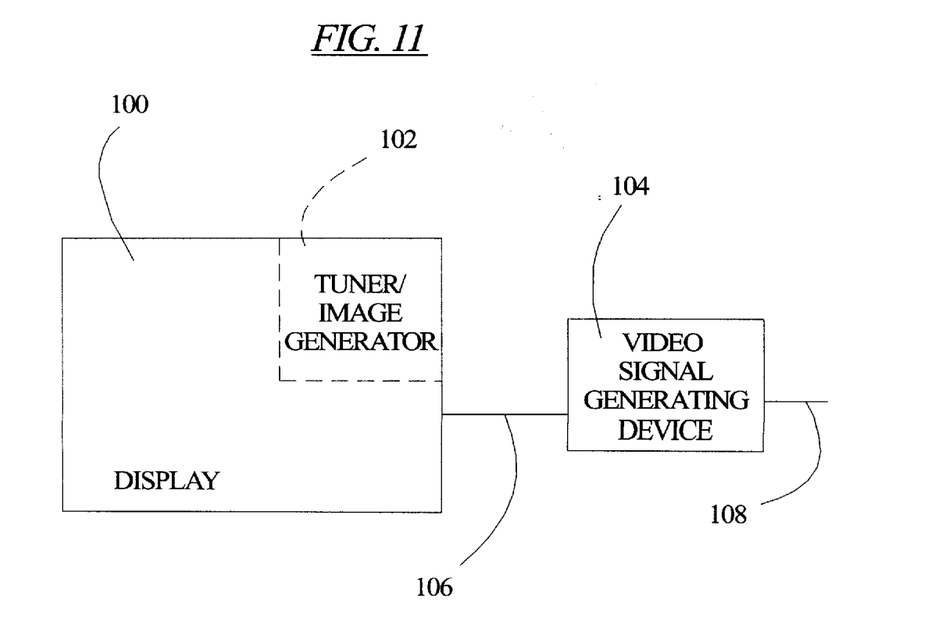
FIG. 11 illustrates in schematic form a variety of display configurations for displaying images generated in accordance with principles of the invention.

In FIG. 11, there is illustrated in schematic form displays for displaying images generated in accordance with the present invention. In FIG. 11 there is illustrated a display device 100 representative of a myriad of display devices including television devices and monitor devices (i.e., displays without television tuners). Item 102 represents either a tuner for a television device, or an image generator for a monitor device. Item 104 represents a myriad of video signal generating devices such as cable television boxes, DVD players, magnetic tape players, external tuners, personal computer video cards, and the like, which are capable of generating signals compatible with the item 102, and transmitting the signals to the device 102 via a suitable medium such as a cable or via wireless technology. Signals may also be received by appropriately configure devices 104 via a terminal 108. Item 104 may also represent an antenna configuration for a tuner 102.

The idea is that the actual device 100 may or may not physically include all of the necessary components to play back the transition paths generated in accordance with the invention. Further, the specific configurations are easily envisioned and assembled by those of ordinary skill, depending on the needs for a given display device, and the extent to which a manufacturer decides to incorporate features into a display device.

For example, there currently are on the market at least three liquid crystal display still image display devices for displaying still images on a table top, much like an electronic picture frame. One such device is made available by Ceiva Logic. Another is available from Sony Corporation. Yet a third is available from Weave Innovations. The first and third devices are configured to receive signals via a connection to the World Wide Web, and to display a series of still images. The Sony Corporation device displays images stored on its own memory module bearing the mark "Memory Stick." However, using the present invention, such devices could display a transition path configured to imperceptibly transition from a first image to a second image by receiving images broadcast over the Internet network system.

To accomplish the foregoing, all that is needed is a server configured to display the transition path with such a timing that the different images are displayed in series for at least 5 seconds each. The transition path, of course, could be configured to last any duration, depending on the starting and ending images desired, as discussed above.

It can also be appreciated that most storage and broadcast media of concern will allow for concurrent storage or broadcast of audio signals so that upon playback, music or voice or the like can accompany the visual display.

While the invention has been discussed in terms of digital images, it can be appreciated that it is equally applicable to analog formats such as video frames. The image processing could involve digitizing the analog signal and then processing the digitized signal as described above, or using spectral analysis or waveform analysis and manipulation techniques. The resultant transition path might even be stored on a magnetic video tape, film or other suitable media as a movie. The methods for generating the images would be similar, however, the recording format may be different. Further, the manner in which the changes would be effected are the same as one would effect changes in current video or still image manipulation techniques. A major difference is that the changes would be made on an imperceptible level, and, in most cases, require a processor programmed to calculate and implement the changes.

The invention also has application in laser displays. In laser displays, a laser is caused to move rapidly over a surface thereby drawing an image on the surface. Because the laser can be caused to redraw the image at frame rates approaching or exceeding 30 frames per second, and because of the latent light retention of the human eye, to the human eye, the whole image is perceived rather than a single dot or point of light. In any event, the laser controller is feed an image pattern in order to direct the laser or lasers to draw the image, typically on the side of a building. In accordance with the invention the image pattern can be a series of images defining a transition path in which any given transition image is imperceptibly different from an immediately preceding different image.

Also, the invention has applicability in the area of holographic displays.

Holography is a technique for recording, and later reconstructing, the amplitude and phase distributions of a wave disturbance. It is widely used as a method of three-dimensional optical image formation, and also with acoustical and radio waves. In optical image formation, the technique is accomplished by recording on a photographic plate the pattern of interference between coherent light reflected from an object of interest, and light that comes directly from the same source or is reflected from a mirror.

A hologram is a special photographic plate or film used in holography. Nihen this negative is developed and illuminated from behind by a coherent gas-laser beam, it produces a three-dimensional image in space. Sometimes it is known as a hologram interferometer.

A multiplex hologram is the holographic storage of photographic information. In a first stage a series of photographs or a certain amount of motion picture footage of the subject is exposed. The number of stills or frames taken depends on how much of an angle of view is desired of the subject in the finished hologram. For example if a 360 degree view of the subject is desired, one might expose 3 frames per degree of movement around the subject (usually the camera remains stationary and subject rotates). This will result in the exposure of 1080 frames. After the film is developed, a series of "slit" holograms are made using a laser and using each frame of film as a subject for each slit of holographic film. The slits are usually about one millimeter wide and are packed so closely that there is no "dead space" in between. Also the hologram is bleached so that the strips disappear.

Usually a multiplex hologram yields horizontal not vertical parallax. This is because the camera usually is moved around the subject (or the subject moves around in front of the camera) and doesn't usually pass over the subject. Also, psychologically, horizontal parallax is much more desirable and the lack of horizontal parallax, to humans, is much more noticeable than the lack of vertical parallax. The multiplex hologram is usually, though not always, made on flexible film coated with the same holographic emulsion as photographic hologram plates.

The procedure can be totally mechanized so that a machine can expose a slit hologram per each frame of footage at a very rapid pace. The advantage of this type of hologram is that one can now have a hologram of almost anything captured on ordinary film without the need of a pulse ruby laser. The disadvantage is that it is not truly a hologram but photographic information holographically stored.

Nonetheless, using the principles of the present invention, a transition path of photographic images, can be formed and then used in generating a series of multiplex holograms that transition imperceptibly from the first image of the series to the last image of the series. In this manner, by way of example only, a three-dimensional image can be caused to rotate very slowly or to evolve very slowly. For example, a flower can be displayed so as to slowly bloom.

Although modifications and changes may be suggested by those skilled in the art, it is the intention of the inventors to embody within the patent warranted hereon all changes and modifications as reasonably and properly come within the scope of their contribution to the art.

What is claimed is:

1. A method comprising the steps of:
   a) comparing first and second electronic representations of at least portions of respective first and second images;
   b) based on said comparison, generating an electronic representation of at least a portion of a transition image that represents a difference from said portion of said first image along a transition path from said first image to said second image, said difference being such that said portion of said transition image is imperceptibly different from said portion of said first image as viewed by an ordinary human observer;
   c) storing said electronic representation of said portion of said transition image;
   d) replacing said first electronic representation of said portion of said first image with said electronic representation of said portion of said transition image; and
   e) repeating steps a–d until a series of electronic representations of portions of transition images are generated defining said transition path from said first image to said second image.

2. The method of claim 1, comprising the further step of communicating each electronic representation of a portion of a transition image via a communications channel.

3. The method of claim 2, wherein each electronic representation of a portion of a transition image is communicated via the communication channel after it is generated, but before the next electronic representation of a portion of a transition image along the transition path is generated.

4. The method of claim 1, wherein said electronic representations of portions of transition images defining said transition path are stored on a recording medium.

5. A method comprising the steps of:
   providing an electronic representation of at least a portion of a first image;
   using a predetermined rate of transition between images, processing at least said portion of said first image and generating a series of electronic representations of corresponding portions of transition images defining a transition path which transitions away from said portion of said first image, said transition path comprising corresponding portions of transition images any given one of which is imperceptibly different from an immediately preceding different corresponding portion of an image along the transition path such that upon successive display of said transition images at said predetermined rate of transition between images or slower, an ordinary human observer will not perceive any difference in said corresponding portions of displayed images over any given 5 second interval;
   making each subsequent different corresponding portion of an image in said transition path different from a prior corresponding portion of an image by an image difference determined prior to generation of the subsequent corresponding portion of an image; and
   storing said electronic representation of said corresponding portions transition images defining said transition path.

6. The method of claim 5, wherein said portion of any given transition image is different from said portion of its immediately preceding image along the transition path by a predetermined difference.

7. The method of claim 5, where said portion of any given transition image is different from said portion of its immediately preceding different image along the path by a random difference.

8. The method of claim 5, comprising the step of broadcasting each electronic representation of a portion of a transition image.

9. The method of claim 5, comprising the step of broadcasting each electronic representation of portion of a transition image after it is generated, but before a subsequent electronic representation of a portion of a subsequent transition is generated.

10. A method comprising the steps of:
    using a predetermined rate of transition between images, generating a series of electronic representations of at least corresponding portions of transition images along a transition path in which each subsequent corresponding portions of an image is imperceptibly different from an immediately preceding different corresponding portion of an image such that upon successive display of said transition images at said predetermined rate of transition between images or slower, an ordinary human observer will not perceive any difference in the displayed corresponding portions of said images over any given 5 second interval;

making each subsequent different corresponding portion of an image in said series different from a prior corresponding portion of an image by an image difference determined prior to generation of the subsequent corresponding portion of an image; and storing said electronic representations of said corresponding portions of said images.

11. The method of claim 10, comprising the further step of broadcasting said electronic representations of said portions of said images.

12. A method comprising the steps of:

receiving a series of electronic representations of different images defining a transition path in which at least a portion of each image thereof is imperceptibly different from an immediately preceding different corresponding portion of an image, each subsequent different corresponding portion of an image in said transition path being different from a prior corresponding portion of an image by an image difference determined prior to generation of the subsequent corresponding portion of an image;

displaying said different images in seriatim with a timing such that a transition between said corresponding portions of said images is imperceptible to an ordinary human observer over any given 5 second interval.

13. The method of claim 12, wherein said electronic representations of said images are stored such that a plurality of copies of a given image are displayed in seriatim to effect such timing.

14. The method of claim 12, wherein said images are displayed on a flat screen display.

15. The method of claim 12, wherein said images are displayed on a cathode ray tube display.

16. The method of claim 12 wherein said images are displayed in a holographic image system.

17. The method of claim 12, wherein said images are displayed on a screen using an image projection device.

18. The method of claim 12, wherein said electronic representations of said images are received via a recording medium and comprising the step of reading said electronic representations of said images from said recording medium.

19. The method of claim 12, wherein said electronic representations of said images are received via a communication channel.

20. The method of claim 19, wherein each of said images is displayed as it is received via said communications channel.

21. The method of claim 19, wherein said electronic representations of said images defining said transition path are received via said communication channel and then said images are displayed in seriatim.

22. A method of displaying a series of images on a display screen, comprising the steps of:

providing a series of electronic representations of images defining a transition path in which at least a portion of any given image is imperceptibly different from an immediately preceding different corresponding portion of an image, each subsequent different corresponding portion of an image in said transition path being different from a prior corresponding portion of and image by an image difference determined prior to generation of the subsequent corresponding portion of an image;

displaying said images in seriatim and with a timing such that transitioning between said corresponding portions of images along said transition path is imperceptible to an ordinary human observer within a given five second interval.

23. The method of claim 22, wherein said series of electronic representations of said images are generated one by one in real time.

24. The method of claim 22, wherein said series of electronic representations of said images are provided in a storage medium.

25. The method of claim 24, wherein said storage medium is a digital video disk.

26. The method of claim 24, wherein said storage medium is a magnetic storage medium.

27. The method of claim 24, wherein said electronic representations of said images are stored in a digital format.

28. The method of claim 24, wherein said electronic representations of said images are stored in an analog format.

29. A method of presenting information, comprising the steps of:

providing a display;

providing a series of electronic representations of images defining a transition path in which at least a portion of any given image is imperceptibly different from an immediately preceding different corresponding portion of a different immediately, each subsequent different corresponding portion of an image in said transition path being different from a prior corresponding portion of an image by an image difference determined prior to generation of the subsequent corresponding portion of an image;

displaying said images in seriatim on said display with a timing such that transitions between different corresponding portions of said images are imperceptible to an ordinary human observer within an interval of five seconds.

30. A method of presenting information, comprising the steps of:

displaying on a display, images along a transition path having transition images in which at least a portion of any given transition image is imperceptibly different from an immediately preceding different corresponding portion of a preceding image, the images being displayed with a timing such that said corresponding portions of said images evolve imperceptibly to an ordinary human observer from a first image within an interval of at least five seconds, each subsequent different corresponding portion of an image in said transition path being different from a prior corresponding portion of an image by an image difference determined prior to generation of the subsequent corresponding portion of an image.

31. A storage medium having stored thereon a series of electronic representations of images defining a transition path, said transition path having images for display in succession at a first predetermined rate such that at least a portion of any given image along the transition path is imperceptibly different from a corresponding portion of an immediately preceding different image along the transition path and such that upon successive display of said images at said predetermined rate or slower, a normal viewer will not perceive any change in said corresponding portions along said transition path over a 5 second interval, each subsequent different corresponding portion of an image in said transition path being different from a prior corresponding portion of an image.

32. The storage medium of claim 31, wherein said storage medium is a digital video disk.

33. The storage medium of claim 31, wherein said storage medium is a magnetic recording medium.

34. The storage medium of claim 31, wherein said storage medium is an optical recording disk.

35. The storage medium of claim 31, wherein said storage medium is a magnetic recording tape.

36. The storage medium of claim 31, wherein said storage medium is a solid state memory module.

37. A system for generating a transition path comprised of a series of transition images, said system comprising:

an input device via which an electronic representation of a first image is received;

a processor programmed to evaluate at least a portion of the first image and to generate a series of electronic representations of corresponding portions of transition images evolving away from a corresponding portion of the first image, said processor programmed to utilize a predetermined playback rate and to generate said corresponding portions of said transition images so that upon playback at said playback rate or slower, an ordinary viewer will not perceive any transitioning between images over a period of at least 5 seconds, each subsequent different corresponding portion of an image in said transition path being made different from a prior corresponding portion of an image by an image difference determined prior to generation of the subsequent corresponding portion of an image; and a storage device coupled to the processor for storing the electronic representations of said transition images as a transition path.

38. The system of claim 37, wherein said processor is programmed to compare said portion of said first image to a corresponding portion of a second image and to generate said transition image as a transition path from said portion of said first image to said corresponding portion of said second image.

39. A method comprising the steps of:

providing a sequence images defining a transition path, the images of the sequence being such that at least a portion of any given image is imperceptibly different from a corresponding portion of an immediately preceding different image, the sequence being provided for in seratim display of the images at a predetermined playback rates such that upon in seratim display of the images at the predetermined playback rate or slower an ordinary viewer with not perceive any transitioning between said corresponding portions of said images over an interval of at least 5 seconds, each subsequent different corresponding portion of an image in said transition path being different from a prior corresponding portion of an image by an image difference determined prior to generation of the subsequent corresponding portion of an image; and broadcasting one or more communications signals comprised of said sequence of images defining a transition path.

* * * * *